(12) United States Patent
Miyasaka et al.

(10) Patent No.: US 8,646,431 B2
(45) Date of Patent: Feb. 11, 2014

(54) VEHICLE PROVIDED WITH VALVE-STOP-MECHANISM-EQUIPPED INTERNAL COMBUSTION ENGINE

(75) Inventors: Katsuichi Miyasaka, Gotemba (JP); Akio Kidooka, Ashigarakami-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/581,000

(22) PCT Filed: Mar. 2, 2010

(86) PCT No.: PCT/JP2010/053335
§ 371 (c)(1),
(2), (4) Date: Aug. 24, 2012

(87) PCT Pub. No.: WO2011/108076
PCT Pub. Date: Sep. 9, 2011

(65) Prior Publication Data
US 2012/0318232 A1 Dec. 20, 2012

(51) Int. Cl.
*F02D 13/06* (2006.01)
*B60T 15/48* (2006.01)
*B60T 13/52* (2006.01)

(52) U.S. Cl.
USPC ............ 123/198 R; 123/90.15; 123/339.23; 188/356; 188/357; 188/358; 188/359; 188/360; 303/3; 303/4; 303/113.1; 303/114.1; 303/114.3

(58) Field of Classification Search
USPC ........ 188/153 D, 355–360; 303/113.1, 113.3, 303/114.1–114.3, 3, 4; 123/198 R, 123/90.15–90.16, 90.11, 339.23; 701/70
See application file for complete search history.

(56) References Cited

U.S. PATENT DOCUMENTS 4,354,464 A * 10/1982 Fujita ............................ 123/323
5,676,101 A * 10/1997 Kawai et al. .............. 123/179.18
(Continued)

FOREIGN PATENT DOCUMENTS

JP 5 33684 2/1993
JP 10 220310 8/1998
(Continued)

OTHER PUBLICATIONS

International Search Report Issued Mar. 30, 2010 in PCT/JP10/53335 Filed Mar. 2, 2010.

*Primary Examiner* — Lindsay Low
*Assistant Examiner* — Kevin Lathers
(74) *Attorney, Agent, or Firm* — Oblon, Spivak, McClelland, Maier & Neustadt, L.L.P.

(57) ABSTRACT

To provide a vehicle provided with a valve-stop-mechanism-equipped internal combustion engine capable of ensuring a negative pressure in a brake booster while preventing with reliability fresh air from flowing into a catalyst during a valve stop control. An internal combustion engine provided with a valve stop mechanism capable of changing the operational state of an intake valve between a valve operating state and a valve closed/stopped state is provided. A brake booster is provided capable of assisting operation of a brake pedal of the vehicle. Exhaust side negative pressure passages are provided as communication passages that are configured to be in communication with each branch pipe section of an exhaust manifold in a period in which a negative pressure is generated in the case where the intake valve is in the valve closed/stopped state while an exhaust valve is allowed to open and close. The remaining end of the second exhaust side negative pressure passage is connected to the brake booster.

5 Claims, 2 Drawing Sheets

(56) References Cited

U.S. PATENT DOCUMENTS

| | | |
|---|---|---|
| 6,526,745 B1 | 3/2003 | Ogiso |
| RE41,758 E * | 9/2010 | Ogiso et al. ............... 123/90.15 |
| 2009/0120390 A1 | 5/2009 | Ezaki et al. |

FOREIGN PATENT DOCUMENTS

| | | |
|---|---|---|
| JP | 10 236301 | 9/1998 |
| JP | 11 336570 | 12/1999 |
| JP | 2000 302026 | 10/2000 |
| JP | 2001 182570 | 7/2001 |
| JP | 2002 274354 | 9/2002 |
| JP | 2004 100560 | 4/2004 |
| JP | 2004 143990 | 5/2004 |
| JP | 2006 76420 | 3/2006 |
| JP | 2007 107433 | 4/2007 |
| JP | 2007 132211 | 5/2007 |

* cited by examiner

VEHICLE PROVIDED WITH VALVE-STOP-MECHANISM-EQUIPPED INTERNAL COMBUSTION ENGINE

TECHNICAL FIELD

The present invention relates to a vehicle provided with a valve-stop-mechanism-equipped internal combustion engine.

BACKGROUND ART

For example, example, Patent Document 1 discloses a conventional control apparatus for an internal combustion engine provided with a valve stop mechanism capable of keeping intake and exhaust valves in the closed position. The conventional control device performs a valve stop control so as to keep the intake and exhaust valves in the closed position in a plurality of cylinders when fuel supply is cut off, in order to suppress deterioration of a catalyst. Besides, if a negative pressure in a brake booster is equal to or lower than a predetermined value during the valve stop control, the valve stop control is released in at least one of the plurality of cylinders. In this way, an inadequate negative pressure in a surge tank (intake manifold) can be compensated for, and a negative pressure can be ensured in the brake booster.

As another example, Patent Document 2 discloses an operation control apparatus for a vehicle. The conventional operation control apparatus has a mechanism that ensures an adequate braking force for the vehicle by supplying exhaust pressure to a transformation chamber of a vacuum booster (brake booster) under operational conditions where an intake negative pressure decreases (such as during rapid acceleration or when the engine is running at high speeds).

Including the above described document, the applicant is aware of the following documents as a related art of the present invention.

CITATION LIST

Patent Documents

Patent Document 1: Japanese Laid-open Patent Application Publication No. 2004-143990
Patent Document 2: Japanese Laid-open Patent Application Publication No. 2002-274354
Patent Document 3: Japanese Laid-open Patent Application Publication No. Hei 5-33684
Patent Document 4: Japanese Laid-open Patent Application Publication No. Hei 11-336570
Patent Document 5: Japanese Laid-open Patent Application Publication No. 2007-107433
Patent Document 6: Japanese Laid-open Patent Application Publication No. Hei 10-236301
Patent Document 7: Japanese Laid-open Patent Application Publication No. 2004-100560

SUMMARY OF INVENTION

Technical Problem

According to the technique described in Patent Document 1, if the valve stop control is released under a situation where the temperature of the catalyst is high, although a negative pressure can be ensured in the brake booster, fresh air cannot be adequately prevented from flowing into the catalyst, so that deterioration of the catalyst cannot be adequately prevented.

The approach described in Patent Document 2 is intended to ensure a braking force for a vehicle by using the exhaust pressure (positive pressure) under an operational condition, in which the exhaust pressure is sufficiently higher than atmospheric pressure, such as during rapid acceleration or when the engine is running at high speeds. However, when the valve stop control is being performed on the intake valve, the pressure in the cylinder does not rise to be sufficiently higher than atmospheric pressure. Therefore, the approach described in Patent Document 2 that uses the positive exhaust pressure has a problem that a useful exhaust pressure for assisting braking of the vehicle cannot be obtained when the valve stop control is being performed on the intake valve.

The present invention has been made to solve the problem described above, and an object of the present invention is to provide a vehicle provided with a valve-stop-mechanism-equipped internal combustion engine capable of ensuring a negative pressure in a brake booster while preventing with reliability fresh air from flowing into a catalyst during a valve stop control.

Solution to Problem

A first aspect of the present invention is a vehicle provided with a valve-stop-mechanism-equipped internal combustion engine, the vehicle comprising:
an internal combustion engine which includes a valve stop mechanism capable of changing an operational state of at least an intake valve of the intake valve and an exhaust valve between a valve operating state and a valve closed/stopped state;
a brake booster which is capable of assisting operation of a brake pedal of the vehicle; and
a communication passage which is configured to be in communication with an exhaust passage or a cylinder of the internal combustion engine during a period in which a negative pressure is generated in the exhaust passage or the cylinder in a case in which the intake valve is in the valve closed/stopped state while the exhaust valve is allowed to open and close,
wherein a remaining end of the communication passage is connected to the brake booster.

A second aspect of the present invention is the vehicle provided with a valve-stop-mechanism-equipped internal combustion engine according to the first aspect of the present invention,
wherein the communication passage is an exhaust side negative pressure passage that connects the exhaust passage and the brake booster during the period in which a negative pressure is generated in the exhaust passage, and
wherein the vehicle further comprises:
a pressure accumulating tank which is provided at some point of the exhaust side negative pressure passage and accumulates the negative pressure generated in the exhaust passage; and
opening/closing means which is configured or controlled to connect the exhaust passage and the pressure accumulating tank to each other via the exhaust side negative pressure passage when pressure in the exhaust passage is a negative pressure and to disconnect the exhaust passage and the pressure accumulating tank from each other when pressure in the exhaust passage is equal to or higher than atmospheric pressure.

A third aspect of the present invention is the vehicle provided with a valve-stop-mechanism-equipped internal combustion engine according to the first aspect of the present invention, wherein the communication passage is an exhaust side negative pressure passage that connects the exhaust passage and the brake booster during the period in which a negative pressure is generated in the exhaust passage, and wherein the vehicle further comprises:

a pressure accumulating tank which is provided at some point of the exhaust side negative pressure passage and accumulates the negative pressure generated in the exhaust passage; and opening/closing means which is configured or controlled to connect the exhaust passage and the pressure accumulating tank to each other via the exhaust side negative pressure passage when pressure in the exhaust passage is a negative pressure higher than a predetermined value and to disconnect the exhaust passage and the pressure accumulating tank from each other when pressure in the exhaust passage is a negative pressure equal to or lower than the predetermined value.

A fourth aspect of the present invention is the vehicle provided with a valve-stop-mechanism-equipped internal combustion engine according to the first aspect of the present invention, wherein the communication passage is an exhaust side negative pressure passage that connects the exhaust passage and the brake booster during the period in which a negative pressure is generated in the exhaust passage, and wherein the vehicle further comprises:

a pressure accumulating tank which is provided at some point of the exhaust side negative pressure passage and accumulates the negative pressure generated in the exhaust passage; and opening/closing means which is configured or controlled to connect the exhaust passage and the pressure accumulating tank to each other via the exhaust side negative pressure passage when the exhaust valve is opened and to disconnect the exhaust passage and the pressure accumulating tank from each other when a piston of the internal combustion engine reaches a vicinity of an expansion bottom dead center.

A fifth aspect of the present invention is the vehicle provided with a valve-stop-mechanism-equipped internal combustion engine according to any one of the second to fourth aspects of the present invention, wherein the vehicle further comprises an intake side negative pressure passage that connects an intake passage of the internal combustion engine and the brake booster, wherein the remaining end of the exhaust side negative pressure passage is connected to a section at some point of the intake side negative pressure passage, and wherein the vehicle further comprises passage switching means that is provided at a connection part between the exhaust side negative pressure passage and the intake side negative pressure passage, and wherein the passage switching means switches between a state in which the intake passage and the brake booster are in communication with each other via the intake side negative pressure passage and a state in which the pressure accumulating tank and the brake booster are in communication with each other via the exhaust side negative pressure passage and a section of the intake passage located closer to the brake booster than the passage switching means.

Advantageous Effects of Invention

According to the first aspect of the present invention, when the intake valve is in the valve closed/stopped state, and the exhaust valve is allowed to open and close, a brake negative pressure can be ensured by using the negative pressure generated in the cylinder. As a result, a brake negative pressure can be ensured while preventing with reliability fresh air from flowing into a catalyst by putting the intake valve in the valve closed/stopped state.

According to the second to fourth aspects of the present invention, when the intake valve is in the valve closed/stopped state, and the exhaust valve is allowed to open and close, the negative pressure generated in the cylinder can be efficiently accumulated in the pressure accumulating tank via the exhaust passage.

According to the fifth aspect of the present invention, even when a situation occurs where the negative pressure in the intake manifold is inadequate, a negative pressure can be immediately ensured in the brake booster by controlling the passage switching means so as to connect the pressure accumulating tank and the brake booster to each other.

Figure 1:
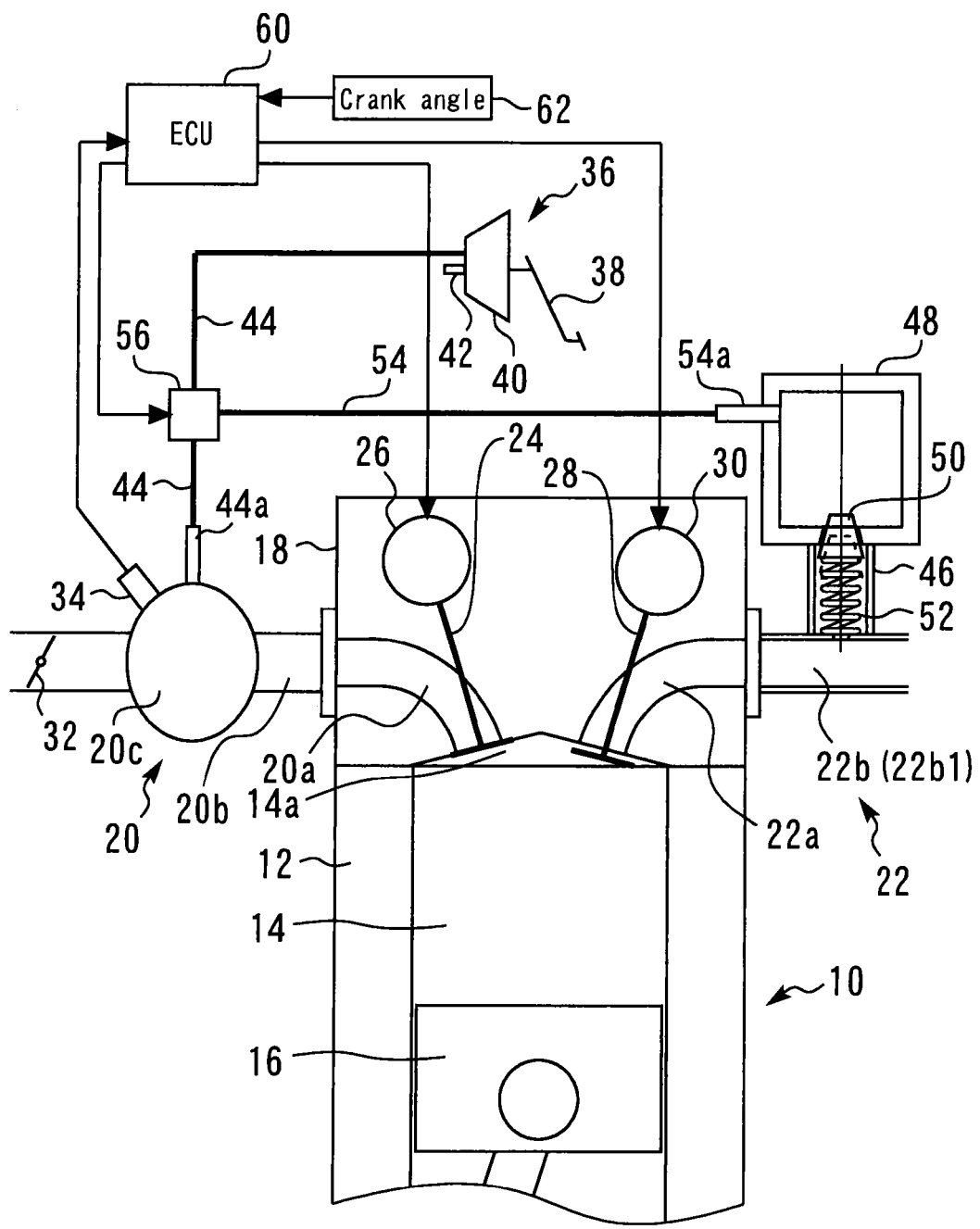
FIG. 1 is a schematic diagram showing a configuration of a vehicle provided with a valve-stop-mechanism-equipped internal combustion engine according to a first embodiment of the present invention.

DESCRIPTION OF SYMBOLS 10 internal combustion engine
14 cylinder
16 piston
20 intake passage
20a intake port
20b intake manifold
20c surge tank
22 exhaust passage
22a exhaust port
22b exhaust manifold
22b1 branch pipe section
24 intake valve
26 intake variable valve operating apparatus
28 exhaust valve
30 exhaust variable valve operating apparatus
32 throttle valve
34 intake pressure sensor
36 brake apparatus
38 brake pedal
40 brake booster
44 intake side negative pressure passage
46 first exhaust side negative pressure passage
48 negative pressure accumulating tank
50 check valve
52 spring
54 second exhaust side negative pressure passage
56 negative pressure switching valve
58 catalyst
60 Electronic Control Unit (ECU)
62 crank angle sensor

DESCRIPTION OF EMBODIMENT

First Embodiment

FIG. 1 is a schematic diagram showing a configuration of a vehicle provided with a valve-stop-mechanism-equipped internal combustion engine according to a first embodiment of the present invention.

As shown in FIG. 1, the vehicle according to the present embodiment has an internal combustion engine 10. In the present embodiment, the internal combustion engine 10 is an in-line four-cylinder-type engine, for example. Four cylinders 14 are formed in a cylinder block 12 of the internal combustion engine 10. A piston 16 is provided in each cylinder 14. A cylinder head 18 is attached to a top of the cylinder block 12. In the cylinder head 18, an intake port 20a of an intake passage 20 and an exhaust port 22a of an exhaust passage 22 are formed in communication with a combustion chamber 14a in each cylinder 14.

An intake valve 24 that opens and closes the intake port 20a is driven by an intake variable valve operating apparatus 26, and an exhaust valve 28 that opens and closes the exhaust port 22a is driven by an exhaust variable valve operating apparatus 30. The variable valve operating apparatuses 26 and 30 have a valve stop mechanism capable of changing the operational states of the intake valve 24 and the exhaust valve 28 between a valve operating state and a valve closed/stopped state. In the following, a control to change the operational state of the intake valve 24 or the exhaust valve 28 from the valve operating state to the valve closed/stopped state will be referred to as a "valve stop control." The configuration of the valve stop mechanism is not particularly limited. For example, the valve stop mechanism can be configured to be capable of stopping oscillation operation of a rocker arm that transfers a cam force to a valve by using a switch pin.

The intake passage 20 has an intake manifold 20b connected to the intake port 20a. The intake manifolds 20b are gathered at a surge tank 20c. A throttle valve 32 is provided in the intake passage 20 at a position located upstream of the surge tank 20c. An intake pressure sensor 34 that detects an intake pressure (more specifically, a negative pressure in the intake manifold) is attached to the surge tank 20c.

The vehicle according to the present embodiment has a brake apparatus 36 that brakes the vehicle. The brake apparatus 36 has a brake pedal 38, a brake booster 40, and a master cylinder 42 as primary components. The brake pedal 38, which is operated by a driver to brake the rotation of wheels, is connected to an input rod (not shown) of the brake booster 40. The brake booster 40 is a device capable of assisting the operation of the brake pedal 38 by generating an assisting force with a predetermined magnification ratio with respect to a pedal pressing force. The brake booster 40 has an output rod (not shown) connected to an input shaft (not shown) of the master cylinder 42. The master cylinder 42 generates a hydraulic pressure in accordance with the acting force from the brake booster 40, which corresponds to the pedal pressing force magnified by the assisting force. The hydraulic pressure generated by the master cylinder 42 is applied to a wheel cylinder, which is provided in a brake mechanism (not shown) for each wheel, via a hydraulic circuit (not shown).

The brake booster 40 according to the present embodiment is a pneumatic brake booster that uses a negative pressure generated by the internal combustion engine 10. An intake side negative pressure passage (an intake side negative pressure hose) 44 is connected to the brake booster 40 at one end thereof. The other end of the intake side negative pressure passage 44 is connected to the surge tank 20c of the intake passage 20 via a negative pressure port 44a.

Figure 2:
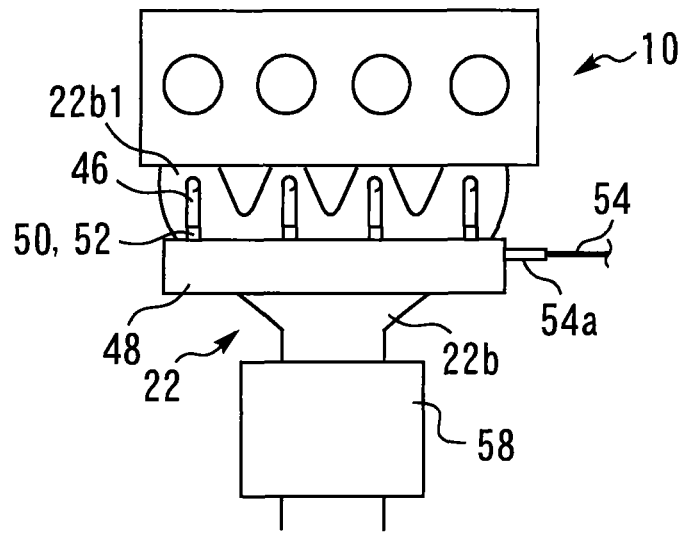
FIG. 2 is a schematic diagram showing a configuration of an exhaust side of the internal combustion engine shown in FIG. 1.

FIG. 2 is a schematic diagram showing a configuration of an exhaust side of the internal combustion engine 10 shown in FIG. 1.

As shown in FIGS. 1 and 2, the exhaust passage 22 of the internal combustion engine 10 has an exhaust manifold 22b connected to the exhaust port 22a. A first exhaust side negative pressure passage 46 is connected to the exhaust manifold 22b at one end thereof More specifically, as shown in FIG. 2, the first exhaust side negative pressure passage 46 is provided for a branch pipe section 22b1 of the exhaust manifold 22b provided for each cylinder.

The remaining end of each first exhaust side negative pressure passage 46 is connected to a negative pressure accumulating tank 48 that accumulates the negative pressure generated in each branch pipe section 22b1 of the exhaust manifold 22b. A check valve 50 and a spring 52 are provided at each connection part between each first exhaust side negative pressure passage 46 and the negative pressure accumulating tank 48. The dimensions of the check valve 50 and the spring force of the spring 52 are determined so that the spring 52 shrinks to open the check valve 50 when the internal pressure of the branch pipe section 22b1 of the exhaust manifold 22b is a negative pressure, and the check valve 50 is closed by the positive pressure acting on the check valve 50 and the spring force of the spring 52 when the internal pressure of the branch pipe section 22b1 is a positive pressure (equal to or higher than atmospheric pressure).

A second exhaust side negative pressure passage (more specifically, a second exhaust side negative pressure hose) 54 is connected, at one end thereof, to the negative pressure accumulating tank 48 via a negative pressure port 54a. The remaining end of the second exhaust side negative pressure passage 54 is connected to some point of the intake side negative pressure passage 44. A negative pressure switching valve 56 is provided at a connection part between the intake side negative pressure passage 44 and the second exhaust side negative pressure passage 54. The negative pressure switching valve 56 is configured to be capable of switching between a state where the intake manifold 20b and the brake booster 40 are in communication with each other via the intake side negative pressure passage 44 and a state where the negative pressure accumulating tank 48 and the brake booster 40 are in communication with each other via the second exhaust side negative pressure passage 54 and the section of the intake side negative pressure passage 44 located closer to the brake booster 40 than the negative pressure switching valve 56. In addition, as shown in FIG. 2, a catalyst 58 for purifying exhaust gas is provided in the exhaust passage 22 at a position located downstream of the exhaust manifold 22b.

The system shown in FIG. 1 has an electronic control unit (ECU) 60. To an input of the ECU 60, various types of sensors for the vehicle, such as the intake pressure sensor 34 described above and a crank angle sensor 62 that detects the number of revolutions of the engine, are connected. To an output of the ECU 60, various types of actuators, such as the variable valve operating apparatuses 26 and 30 and the negative pressure switching valve 56 described above, are connected. The ECU 60 controls the operational states of the internal combustion engine 10 and the vehicle provided with the engine based on outputs of the sensors.

Figure 3:
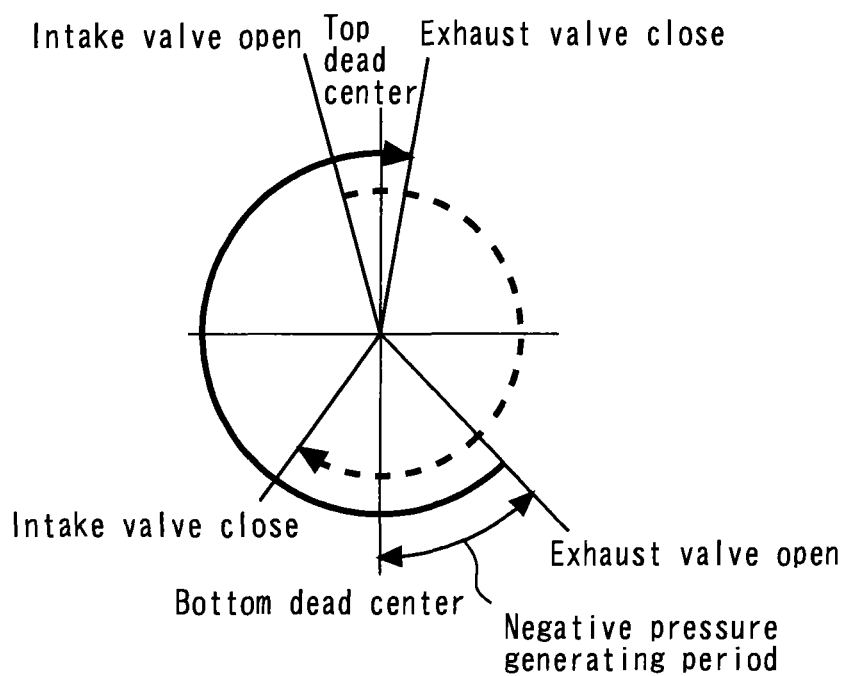
FIG. 3 is a diagram showing valve timings of each of an intake valve and an exhaust valve of the internal combustion engine.

FIG. 3 is a diagram showing valve timings of each of the intake valve 24 and the exhaust valve 28 of the internal combustion engine 10. More specifically, as shown by the dashed line in FIG. 3, the intake valve 24 is configured to open at a predetermined time on the advanced side of an exhaust top dead center and then close at a predetermined time on the retarded side of an intake bottom dead center. As shown by the solid line in FIG. 3, the exhaust valve 28 is configured to open at a predetermined time on the advanced side of an expansion bottom dead center and then close at a predetermined time on the retarded side of the exhaust top dead center.

If the value stop control is performed on the intake valve 24, and the exhaust valve 28 is allowed to normally open and close, the gas in the cylinder 14 is discharged in the exhaust stroke, and after that, the cylinder 14 is blocked from the intake passage 20 and the exhaust passage 22 and then enters into the intake stroke, the compression stroke and then the expansion stroke. As a result, in the expansion stroke, a negative pressure significantly develops in the cylinder 14 as the piston 16 lowers. Then, in the course of the expansion stroke in which the pressure in the cylinder 14 is a negative pressure, the exhaust valve 28 opens. Therefore, at the instant of the exhaust valve 28 opening, a negative pressure is formed in the branch pipe section 22b1 of the exhaust manifold 22b corresponding to the cylinder on which the exhaust valve 28 is provided. Until the piston 16 reaches the expansion bottom dead center, the negative pressure state in the cylinder 14 is maintained, and therefore, the negative pressure state in the branch pipe section 22b1 is also maintained. In this way, in a period from the time of opening of the exhaust valve 28 to the expansion bottom dead center, referred to as a "negative pressure generating period" in FIG. 3, a negative pressure is generated in the branch pipe section 22b1 of the exhaust manifold 22b corresponding to the cylinder whose exhaust valve 28 is open.

There is a problem that the catalyst 58 deteriorates if an oxygen-rich fresh air flows into the catalyst 58 when the temperature of the catalyst 58 is high. In the system according to the present embodiment configured as described above, when a request for fuel cut-off of the internal combustion engine 10 is issued during deceleration or the like, the valve stop control is performed on only the intake valve 24 or both the intake valve 24 and the exhaust valve 28. In this way, fresh air can be prevented from flowing into the catalyst 58 during fuel cut-off, thereby preventing deterioration of the catalyst 58. However, if the intake valve 24 enters into the valve closed/stopped state under the valve stop control during operation of the internal combustion engine 10, the negative pressure in the intake manifold is lost. Therefore, if the negative pressure in the brake booster 40 is consumed by operation of the brake pedal 38, there is a concern that the brake negative pressure becomes inadequate.

According to the present embodiment, if it is determined based on the value of the negative pressure in the intake manifold detected by the intake pressure sensor 34 that the required brake negative pressure is not attained when the valve stop control is being performed on the intake valve 24 and the exhaust valve 28, the operational state of the exhaust valve 28 is switched to the valve operating state. If the valve stop control is performed on the intake valve 24 while the exhaust valve 28 is allowed to normally open and close as described above, a negative pressure is generated in each branch pipe section 22b1 of the exhaust manifold 22b in the "negative pressure generating period" shown in FIG. 3 described above.

With the check valve 50 and the spring 52 configured as described above, the spring 52 shrinks to open the check valve 50 when a negative pressure is formed in the branch pipe section 22b1 of the exhaust manifold 22b. As a result, the branch pipe section 22b1 in the negative pressure state and the negative pressure accumulating tank 48 are in communication with each other. As a result, a negative pressure is formed in the negative pressure accumulating tank 48.

After the negative pressure generating period, when the piston 16 starts to rise, a positive pressure is formed in the cylinder 14, and accordingly, a positive pressure (close to atmospheric pressure) is formed in the branch pipe section 22b1 having been in the negative pressure state. If a positive pressure is formed in the branch pipe section 22b1, the check valve 50 quickly closes by the action of the positive pressure and the spring force of the spring 52. In this way, the interior of the negative pressure accumulating tank 48 is maintained in the negative pressure state.

If the valve stop control is performed on the intake valve 24 while the exhaust valve 28 is allowed to normally open and close, the above-described operation repeatedly occurs in each cylinder of the internal combustion engine 10 in units of the valve open cycle of the exhaust valve 28. As a result, the interior of the negative pressure accumulating tank 48 can be maintained in the negative pressure state. In addition, when a control to put the intake valve 24 in the valve closed/stopped state and put the exhaust valve 28 in the valve operating state is performed, or the exhaust valve 28 is switched to the valve operating state when the valve stop control is being performed on the intake valve 24 and the exhaust valve 28, the negative pressure switching valve 56 is switched so that the brake booster 40 and the negative pressure accumulating tank 48 are in communication with each other. In this way, even when the intake valve 24 is in the valve closed/stopped state, an adequate brake negative pressure can be ensured.

During normal operation of the internal combustion engine 10 after the intake valve 24 is put back to the valve operating state, combustion occurs, so that a positive pressure is formed in each branch pipe section 22b1 of the exhaust manifold 22b. As a result, the check valve 50 is closed, and therefore, the interior of the negative pressure accumulating tank 48 during normal operation of the internal combustion engine 10 is maintained in the negative pressure state.

As described above, the arrangement according to the present embodiment that includes the exhaust side negative pressure passages 46 and 54, the negative pressure accumulating tank 48, the check valve 50, the spring 52 and the negative pressure switching valve 56 can ensure a brake negative pressure by using the negative pressure generated in the cylinder 14 (the exhaust passage 22) when the valve stop control is performed on the intake valve 24 and the exhaust valve 28 is allowed to normally open and close. Therefore, a brake negative pressure can be ensured while putting the intake valve 24 in the valve closed/stopped state and thereby preventing fresh air from flowing into the catalyst 58 with reliability.

In addition, with the arrangement according to the present embodiment described above, the negative pressure periodically generated in the branch pipe sections 22b1 of the cylinders can be sequentially and efficiently accumulated in the negative pressure accumulating tank 48 through the respective check valves 50.

In addition, the arrangement according to the present embodiment described above is useful under the situation described below. That is, when the brake pedal is pressed immediately after the acceleration pedal is pressed to start the vehicle, the throttle valve is still open, and therefore, the negative pressure in the intake manifold is low. Even in such a case, the arrangement according to the present embodiment described above can use the negative pressure accumulated in the negative pressure accumulating tank 48 by switching the negative pressure switching valve 56 so that the negative pressure accumulating tank 48 and the brake booster 40 are in communication with each other. As a result, an adequate brake performance can be ensured immediately after starting of the vehicle.

The check valve 50 and the spring 52 used in Embodiment 1 described above are configured so that the spring 52 shrinks to open the check valve 50 when the internal pressure of the branch pipe section 22b1 of the exhaust manifold 22b is a negative pressure, and the check valve 50 is closed by the positive pressure and the spring force of the spring 52 acting on the check valve 50 when the internal pressure of the branch pipe section 22b1 becomes a positive pressure (equal to or higher than atmospheric pressure). However, opening/closing means according to the present invention is not limited to this configuration. For example, the opening/closing means may be a valve (such as a solenoid valve) that is controlled, based on the crank angle detected by the crank angle sensor 62, to connect the exhaust passage 22 and the negative pressure accumulating tank 48 to each other via the first exhaust side negative pressure passage 46 when the pressure in the exhaust passage 22 (branch pipe section 22b1) is a negative pressure and to disconnect the exhaust passage 22 and the negative pressure accumulating tank 48 from each other when the pressure in the exhaust passage 22 (branch pipe section 22b1) is equal to or higher than atmospheric pressure.

The opening/closing means according to the present invention is not limited to means that is configured or controlled to connect the exhaust passage and the accumulating tank to each other or disconnect them from each other based on whether the pressure in the exhaust passage is a negative pressure, or equal to or higher than atmospheric pressure. Specifically, for example, the opening/closing means may be a valve (such as a check valve or a solenoid valve) that is configured or controlled to connect the exhaust passage 22 and the negative pressure accumulating tank 48 to each other via the first exhaust side negative pressure passage 46 when the pressure in the exhaust passage 22 (branch pipe section 22b1) is a negative pressure higher than a predetermined value, and to disconnect the exhaust passage 22 and the negative pressure accumulating tank 48 from each other when the pressure in the exhaust passage 22 (branch pipe section 22b1) is a negative pressure equal to or lower than the predetermined value. With such a configuration, a negative pressure lower than atmospheric pressure (the predetermined value described above) is used as a threshold to determine whether the exhaust passage 22 and the negative pressure accumulating tank 48 are connected to or disconnected from each other, and thereby the negative pressure in the negative pressure accumulating tank 48 can be prevented with reliability from lowering when the pressure in the exhaust passage 22 rises.

As an alternative to the configurations described above, the opening/closing means according to the present invention may, for example, be a valve (such as a solenoid valve) that is configured or controlled to connect the exhaust passage 22 and the negative pressure accumulating tank 48 to each other via the first exhaust side negative pressure passage 46 when the exhaust valve 28 is opened and to disconnect the exhaust passage 22 and the negative pressure accumulating tank 48 from each other when the piston 16 reaches a vicinity of the expansion bottom dead center. Besides, if the number of revolutions of the engine changes, the time when the pressure in the cylinder 14 changes from negative pressure to positive pressure also changes because of the inertia of the gas flowing into the cylinder 14 through the exhaust passage 22 when the exhaust valve 28 is opened. Therefore, the time of disconnecting the exhaust passage 22 and the negative pressure accumulating tank 48 from each other in the vicinity of the expansion bottom dead center can be variable depending on the number of revolutions of the engine.

In the first embodiment, a configuration has been described as an example in which one end of each first exhaust side negative pressure passage 46 is connected to each branch pipe section 22b1 of the exhaust manifold 22b. However, a communication passage according to the present invention does not always have to be connected to the exhaust passage. That is, the communication passage according to the present invention may be configured to be in communication with the cylinder 14 of the internal combustion engine 10 in a period in which a negative pressure is generated.

In the first embodiment, a configuration has been described as an example in which the negative pressure accumulating tank 48 is provided between the first exhaust side negative pressure passage 46 and the second exhaust side negative pressure passage 54, and the other end of the second exhaust side negative pressure passage 54 is connected to some point of the intake side negative pressure passage 44 via the negative pressure switching valve 56. However, the present invention is not limited to this configuration. That is, for example, a configuration is also possible in which the exhaust side negative pressure passage provided with a pressure accumulating tank in some point thereof is directly connected to the brake booster without being merged with the intake side negative pressure passage. Furthermore, a configuration is also possible in which an exhaust side negative pressure passage without such pressure accumulating tank may be directly connected to the brake booster.

In the first embodiment, a configuration has been described as an example which is provided with the valve stop mechanism capable of performing the valve stop control on both the intake valve 24 and the exhaust valve 28. However, the present invention is not limited to this configuration, and the valve stop mechanism may be provided only for the intake valve.

The valve stop mechanism (not shown) of the variable valve operating apparatuses 26 and 30 in the first embodiment described above corresponds to a "valve stop mechanism" according to the first aspect of the present invention, and the first exhaust side negative pressure passage 46 and the second exhaust side negative pressure passage 54 in the first embodiment described above each correspond to a "communication passage" according to the first aspect of the present invention.

The first exhaust side negative pressure passage 46 and the second exhaust side negative pressure passage 54 each correspond to an "exhaust side negative pressure passage" according to the second to fourth aspects of the present invention, the negative pressure accumulating tank 48 corresponds to a "pressure accumulating tank" according to the second aspect of the present invention, and the check valve 50 and the spring 52 correspond to "opening/closing means" according to the second aspect of the present invention.

The negative pressure switching valve 56 corresponds to "passage switching means" according to the fifth aspect of the present invention.

The invention claimed is:

1. A vehicle provided with a valve-stop-mechanism-equipped internal combustion engine, the vehicle comprising:

an internal combustion engine which includes a valve stop mechanism capable of changing an operational state of at least an intake valve of the intake valve and an exhaust valve between a valve operating state and a valve closed/stopped state;

a brake booster which is capable of assisting operation of a brake pedal of the vehicle;

an exhaust side negative pressure passage which is configured to be in communication with an exhaust passage of the internal combustion engine during a period in which a negative pressure is generated in the exhaust passage in a case in which the intake valve is in the valve closed/stopped state while the exhaust valve is allowed to open and close; and an intake side negative pressure passage that connects an intake passage of the internal combustion engine and the brake booster, wherein a remaining end of the exhaust side negative pressure passage is connected to the brake booster via a section at some point of the intake side negative pressure passage, wherein the vehicle further comprises:

a pressure accumulating tank which is provided at some point of the exhaust side negative pressure passage and accumulates the negative pressure generated in the exhaust passage; and passage switching means that is provided at a connection part between the exhaust side negative pressure passage and the intake side negative pressure passage, and wherein the passage switching means switches between a state in which the intake passage and the brake booster are in communication with each other via the intake side negative pressure passage and a state in which the pressure accumulating tank and the brake booster are in communication with each other via the exhaust side negative pressure passage and a section of the intake side negative pressure passage located closer to the brake booster than the passage switching means.

2. The vehicle provided with a valve-stop-mechanism-equipped internal combustion engine according to claim 1, wherein the vehicle further comprises opening/closing means which is configured or controlled to connect the exhaust passage and the pressure accumulating tank to each other via the exhaust side negative pressure passage when pressure in the exhaust passage is a negative pressure and to disconnect the exhaust passage and the pressure accumulating tank from each other when pressure in the exhaust passage is equal to or higher than atmospheric pressure.

3. The vehicle provided with a valve-stop-mechanism-equipped internal combustion engine according to claim 1, wherein the vehicle further comprises opening/closing means which is configured or controlled to connect the exhaust passage and the pressure accumulating tank to each other via the exhaust side negative pressure passage when pressure in the exhaust passage is a negative pressure higher than a predetermined value and to disconnect the exhaust passage and the pressure accumulating tank from each other when pressure in the exhaust passage is a negative pressure equal to or lower than the predetermined value.

4. The vehicle provided with a valve-stop-mechanism-equipped internal combustion engine according to claim 1, wherein the vehicle further comprises opening/closing means which is configured or controlled to connect the exhaust passage and the pressure accumulating tank to each other via the exhaust side negative pressure passage when the exhaust valve is opened and to disconnect the exhaust passage and the pressure accumulating tank from each other when a piston of the internal combustion engine reaches a vicinity of an expansion bottom dead center.

5. A vehicle provided with a valve-stop-mechanism-equipped internal combustion engine, the vehicle comprising:

an internal combustion engine which includes a valve stop mechanism capable of changing an operational state of at least an intake valve of the intake valve and an exhaust valve between a valve operating state and a valve closed/stopped state;

a brake booster which is capable of assisting operation of a brake pedal of the vehicle;

an exhaust side negative pressure passage which is configured to be in communication with an exhaust passage of the internal combustion engine during a period in which a negative pressure is generated in the exhaust passage in a case in which the intake valve is in the valve closed/stopped state while the exhaust valve is allowed to open and close; and an intake side negative pressure passage that connects an intake passage of the internal combustion engine and the brake booster, wherein a remaining end of the exhaust side negative pressure passage is connected to the brake booster via a section at some point of the intake side negative pressure passage, wherein the vehicle further comprises:

a pressure accumulating tank which is provided at some point of the exhaust side negative pressure passage and accumulates the negative pressure generated in the exhaust passage; and one or more passage switching valves that is provided at a connection part between the exhaust side negative pressure passage and the intake side negative pressure passage, and wherein the one or more passage switching valves switches between a state in which the intake passage and the brake booster are in communication with each other via the intake side negative pressure passage and a state in which the pressure accumulating tank and the brake booster are in communication with each other via the exhaust side negative pressure passage and a section of the intake passage located closer to the brake booster than the one or more passage switching valves.

* * * * *